United States Patent [19]
Attarwala et al.

[11] Patent Number: 5,328,944
[45] Date of Patent: Jul. 12, 1994

[54] CYANOACRYLATE ADHESIVES WITH IMPROVED CURED THERMAL PROPERTIES

[75] Inventors: Shabbir Attarwala, West Hartford; Philip T. Klemarczyk, Collinsville, both of Conn.

[73] Assignee: Loctite Corporation, Hartford, Conn.

[21] Appl. No.: 913,139

[22] Filed: Jul. 14, 1992

[51] Int. Cl.$^5$ ............................ C08K 5/45; C08K 5/41; C08K 5/42

[52] U.S. Cl. .................................. 524/83; 524/155; 524/157; 524/158; 524/167; 524/170; 524/173

[58] Field of Search ............... 558/306, 307; 524/157, 524/158, 83, 173, 155, 167, 170, 172; 526/222, 225

[56] References Cited

U.S. PATENT DOCUMENTS

| | | | |
|---|---|---|---|
| 2,665,299 | 1/1954 | Ardis | 538/307 |
| 3,355,482 | 11/1967 | Coover et al. | 558/307 |
| 3,557,185 | 1/1971 | Ito et al. | 260/465.4 |
| 3,640,792 | 2/1972 | Bolger et al. | 260/78.4 |
| 3,652,635 | 3/1972 | Kawamura et al. | 526/222 |
| 3,699,076 | 10/1972 | Thomsen et al. | 260/41 C |
| 3,699,127 | 10/1972 | O'Sullivan et al. | 260/33.2 |
| 3,742,018 | 6/1973 | O'Sullivan | 558/307 |
| 3,832,234 | 8/1974 | O'Sullivan et al. | 260/78.5 |
| 3,836,377 | 9/1974 | Dalahunty | 106/287 |
| 3,961,966 | 6/1976 | Brinkmann et al. | 106/36 |
| 4,035,334 | 7/1977 | Davydov et al. | 260/42.21 |
| 4,038,345 | 7/1977 | O'Sullivan et al. | 260/881 |
| 4,062,827 | 12/1977 | Zollman | 260/42.21 |

(List continued on next page.)

FOREIGN PATENT DOCUMENTS

| | | |
|---|---|---|
| 723603 | 5/1969 | Belgium . |
| 845247 | 6/1970 | Canada . |
| 48-8732 | 3/1973 | Japan . |
| 47-61369 | 2/1974 | Japan . |
| 47-61370 | 2/1974 | Japan . |
| 52-80336 | 7/1977 | Japan . |
| 55-36243 | 3/1980 | Japan . |
| 55-66980 | 5/1980 | Japan . |
| 3-117741 | 8/1991 | Japan . |
| 1196069 | 6/1970 | United Kingdom . |

OTHER PUBLICATIONS

Brandt, et al., *J. Polymer Sci: A: Polymer Chem.*, 27 1957-1965 (1989).

(List continued on next page.)

*Primary Examiner*—Veronica P. Hoke
*Attorney, Agent, or Firm*—Vidas, Arrett & Steinkraus

[57] ABSTRACT

A cyanoacrylate monomer adhesive formulation which has improved thermal properties resulting from the inclusion in the formulation of an effective amount for enhancing the thermal resistance of the cured polymer of a sulfur containing compound of the formula:

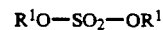

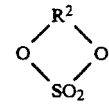

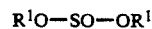

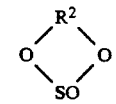

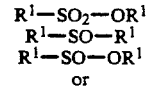

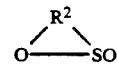

where $R^1$ and $R^2$ are, respectively, monovalent and divalent hydrocarbon groups which may be optionally substituted with halogen, $NO_2$, oxo, CN, alkoxy, hydroxy, acyloxy or $SO_2$ or interrupted by one or more ether oxygen atoms.

21 Claims, No Drawings

U.S. PATENT DOCUMENTS

| | | | |
|---|---|---|---|
| 4,139,693 | 2/1979 | Schoenberg | 526/297 |
| 4,170,585 | 10/1979 | Motegi et al. | 260/33.2 R |
| 4,182,823 | 1/1980 | Schoenberg | 526/298 |
| 4,196,271 | 4/1980 | Yamada et al. | 525/242 |
| 4,307,216 | 12/1981 | Shiraishi et al. | 526/298 |
| 4,321,180 | 3/1982 | Kimura et al. | 524/549 |
| 4,377,490 | 3/1983 | Shiraishi et al. | 252/188.3 R |
| 4,405,750 | 9/1983 | Nakata et al. | 524/717 |
| 4,424,327 | 1/1984 | Reich et al. | 526/222 |
| 4,440,910 | 4/1984 | O'Connor | 525/295 |
| 4,444,933 | 4/1984 | Columbus et al. | 524/292 |
| 4,450,265 | 5/1984 | Harris | 526/248 |
| 4,490,051 | 12/1984 | Mariotti et al. | 526/298 |
| 4,532,293 | 7/1985 | Ikeda et al. | 524/754 |
| 4,560,723 | 12/1985 | Millet et al. | 524/486 |
| 4,565,883 | 1/1986 | Sieger et al. | 558/307 |
| 4,837,260 | 6/1989 | Sato et al. | 524/261 |

OTHER PUBLICATIONS

Hall, et al., *Acc. Chem. Res.*, 1990, 23, 3–9.
Hertler, et al., *J. Amer. Chem. Soc.*, 84, 3387–3393 (1962).
Itoh, et al., *Macromolecules*, 1990, 23, 3548–3550.
Hall, et al., *Macromolecules*, 1990, 23, 913–917.
Brandt, et al., *Polym. Prepr. (Am. Chem. Soc., Div. Polym. Chem.)*, 30, 346–7 (1989).
Thomas, et al., *J. Chem. Soc. (B), Phys. Chem*, 1970, 1039–1043.
Gao, et al., *J. Am. Chem. Soc.*, 110, 1988, 7538–7539.
Inoue, et al, *Die Makromolekulare Chemie*, 125 (1969) 170–180.
Archer, et al., *J. Org. Chem.*, 1984, 49, 4133–4138.
Blackbourn, et al., J. Chem. Soc. (C), Org., (1971) 257–259.
Huu-Dau, et al., J. Chem. Research (S), (1985) 126–127.
Fenn, et al., J. Chem. Soc. (B), Phys. Org., (1970) 1044–1052.
Crowe, et al., Chemistry & Industry (Feb. 8, 1969) 170–171.
Ballard, et al., J. Chem. Soc. (B), Phys. Org., (1967) 976–980.
Ballard, et al., J. Chem. Soc. (B), Phys. Org., (1967) 702–709.

CYANOACRYLATE ADHESIVES WITH IMPROVED CURED THERMAL PROPERTIES

BACKGROUND OF THE INVENTION

Cyanoacrylate monomer adhesives are well known and widely used as "instant adhesives", so-called because of their very rapid polymerization on contact with surfaces containing even very weak anion sources. However, a notorious problem of cyanoacrylate polymers is their susceptibility to thermal degradation at only moderately high temperatures. As a consequence, the instant adhesive benefits of cyanoacrylate monomers have not been available in many applications where the bonded substrates may be subjected to intermittent temperatures in excess of 120° C. or extended exposure to temperatures of about 80° C. This problem of thermal stability of cyanoacrylate polymers is distinct from the problem of stabilizing monomer formulations against premature polymerization. However, to preserve the instant adhesive benefits of cyanoacrylates, it must be appreciated that improvements in polymer thermal stability should not significantly degrade the storage stability or cure speed of the monomer formulation from which the polymer is derived.

Numerous attempts have been made to improve the thermal stability of cyanoacrylate adhesive bonds. In U.S. Pat. No. 3,832,334, the addition of maleic anhydride is said to produce adhesives which have increased thermal resistance while preserving fast cure speed of the cyanoacrylate adhesive.

In U.S. Pat. No. 4,196,271, tri-, tetra- and higher carboxylic acids or there anhydrides are said to be useful for improving heat resistance of cured cyanoacrylate adhesives. Phthalic anhydride is reported to improve heat resistance of cyanoacrylate adhesive bonds in U.S. Pat. No. 4,450,265 and benzopheonetetracarboxylic acid or its anhydride are reported to provide a superior heat resistance for cyanoacrylate adhesives in U.S. Pat. No. 4,532,293.

According to Chem. Abst., 85:64138p a cyanoacrylate adhesive which includes a graft copolymer of methyl methacrylate and a fluorine containing rubber as a plasticizer is reported to give improved stability to thermal shocks. Cyanoacrylate adhesives elastomeric acrylic rubbers are reported to give improved properties, particularly after exposure to elevated temperatures, in U.S. Pat. No. 4,440,910.

In U.S. Pat. No. 4,490,515, cyanoacrylate compounds containing certain maleimide or nadimide compounds are reported to improve the hot strength properties of cyanoacrylate adhesives.

Mixtures of certain sulfone compounds and a dicarboxylic acid or dicarboxylic anhydride are said to greatly improve heat resistance of cyanoacrylate adhesives in JP 55/066980.

In Chem. Abst., 80(22): 121806c (abstracting JP 48/8732) cyanoacrylates containing 3-25% divinyl sulfone are reported to have improved heat resistance.

Despite this extensive work in the art, there continues to be a need to identify materials which will improve the heat performance of cyanoacrylate adhesives so as to increase the options available to the formulator and/or provide further improvements over the existing additives known to enhance cyanoacrylate thermal resistance.

SUMMARY OF THE INVENTION

The inventors herein have discovered that certain sulphur containing compounds, distinct from the sulfones referenced in JP 48/8732 and 55/066980, provide cyanoacrylate adhesive compositions with improved thermal resistance properties.

The invention comprises a cyanoacrylate monomer adhesive formulation which has improved thermal properties resulting from the inclusion in the formulation of an effective amount for enhancing the thermal resistance of the cured polymer of a sulfur containing compound of the formula:

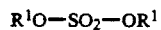

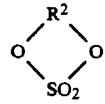

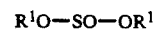

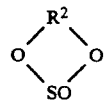

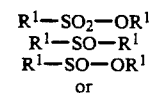

or

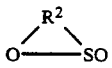

where $R^1$ and $R^2$ are, respectively, monovalent and divalent hydrocarbon groups which may be optionally substituted with halogen, $NO_2$, oxo (=O), CN, alkoxy, hydroxy, acyloxy or $SO_2$ or interrupted by one or more ether oxygen atoms.

The sulfur compounds are suitably employed at levels of 0.1-10% by weight of the formulation.

DETAILED DESCRIPTION OF THE INVENTION

The α-cyanoacrylate adhesive compositions of this invention contain as their principal ingredient one or more α-cyanoacrylate monomers of the formula:

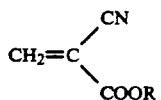

where R represents a $C_{1-6}$ alkyl, cycloalkyl, alkenyl, alkynyl, cycloalkenyl, alkaryl, aralkyl or aryl group, any of which may be optionally substituted or, interrupted with non-basic groups, such as oxo, halo, silicon and ether oxygen, which do not interfere with the stability and functioning of the monomer as an adhesive. Specific examples of the groups for R are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chlorobutyl group, a trifluoroethyl group, a 2-methoxyethyl group, a 3-methoxybutyl group and a 2-ethoxyethyl group. Ethyl cyanoacrylate is the preferred monomer for use in the inventive compositions.

A single α-cyanoacrylate monomer or a mixture of two or more of these α-cyanoacrylate monomers can be used. For a number of applications, the above α-cyanoacrylate monomer alone is not sufficient as an adhesive, and at least some of the components set forth below are typically added.

(1) An anionic polymerization inhibitor;
(2) A radical polymerization inhibitor;
(3) A thickener;
(4) Special additives such as cure accelerators, plasticizers tougheners and heat stabilizers;
(5) Perfumes, dyes, pigments, etc.

A suitable amount of the α-cyanoacrylate monomer present in the adhesive composition is about 75 to 99 by weight, based on the total weight of the adhesive composition.

An anionic polymerization inhibitor is added to the α-cyanoacrylate adhesive composition, e.g., in an amount of about 1 to 1000 ppm based on the total weight of the adhesive composition, to increase the stability of the adhesive composition during storage, and examples of known inhibitors are sulfur dioxide, sulfur trioxide, nitric oxide, hydrogen fluoride, and certain sultones. Particularly preferred for purposes of this invention are combinations of methane sulfonic acid (MSA) of hydroxypropane sulfonic acid (HPSA) with sulfur dioxide. Preferred concentrations of sulfonic acids range from about 5 to about 100, more preferably about 10 to 50, parts per million (based on monomer weight). The preferred concentrations of $SO_2$ range from about 15 to about 50 ppm for either acid.

While not essential, the cyanoacrylate adhesive compositions of this invention generally also contain an inhibitor of the free radical polymerization. The most desirable of these inhibitors are of the phenolic type, such as quinone, hydroquinone, t-butyl catechol, p-methoxyl-phenol, etc.

The above inhibitors may be used within wide ranges, but the following general guidelines are representative of the adhesive composition: acid gases, from about 0.001% to about 0.06% by weight; sultones, from about 0.1% to about 10% by weight; sulfonic acids, from about 0.0005% to about 0.1% by weight; and free radical inhibitors, from about 0.001% to about 1%.

A thickener frequently is added to increase the viscosity of the α-cyanoacrylate adhesive composition. The α-cyanoacrylate monomer generally has a low viscosity of about several centipoises, and therefore, the adhesive penetrates into porous materials such as wood and leather or adherents having a rough surface. Thus, good adhesion strengths are difficult to obtain. Various polymers can be used as thickeners and examples include poly(methyl) methacrylate, methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition.

A number of conventional polymer additives may also be added for toughening purposes. Examples include acrylic elastomers, acrylonitrile copolymer elastomers and fluoro elastomers. In appropriate amounts such materials may serve as both thickener and toughener.

Certain fumed silica fillers may also be usefully employed as cyanoacrylate thickeners. A number of such silicas are known. As disclosed in U.S. Pat. No. 4,477,607, silicas treated with polydialkylsiloxanes or trialkylsilanes are preferably employed.

As examples of cure accelerators there are known, for instance, calixarene compounds as described in U.S. Pat. No. 4,556,700 and U.S. Pat. No. 4,695,615 and silacrown compounds as described in U.S. Pat. No. 4,906,317. Other accelerators are well known to those skilled in the art.

The thermal property enhancing sulfur-containing additives utilized in the invention, include by way of example:

Acyclic and cyclic sulfates such as diphenyl sulfate, dibutyl sulfate, and compounds, such as 1,3,2-dioxathiolene-4-ethyl-2,2-dioxide and the di(cyclic sulfate) of 1,2,7,8-octane tetraol which have one or more groups of the formula:

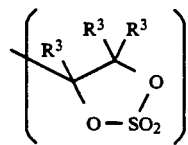

where
the $R^3$ groups are independently H, alkyl or aryl;
Anhydrosulfites such as α-hydroxyisobutynic acid anhydrosulfite;
Sulfoxides such as dibutylsulfoxide, di-α,α'-phenylethylsulfoxide and α-methylthioxo-γ-butyrolactone;
Sulfites such as glycol sulfite, dimethyl sulfite diethyl sulfite and o-phenylene sulfite;
Sulfonates, such as ethyl methanesulfonate, ethyl trifluoromethane sulfonate, methyl p-toluenesulfonate, n-butyl p-toluenesulfonate, benzyl p-toluenesulfonate, α-methylbenzyl p-toluenesulfonate, α,α-dimethylbenzyl p-toluenesulfonate and the diethyl ester of acetone disulfonic acid; and
Sulfinates such as menthyl-p-toluenesulfonate.

These compounds are usefully employed at levels in the range of 0.1%–10% by weight of the formulation, preferably at least 0.5% and more typically 0.75%–5% by weight of the formulation.

Other common additives for cyanoacrylate adhesive compositions are plasticizers. Plasticizers serve to make the cured bonds less brittle and, therefore, more durable. The most common of these plasticizers are $C_1$ to $C_{10}$ alkyl esters of dibasic acids such as sebasic acid and malonic acid. Other plasticizers, such as diaryl ethers and polyurethanes, also may be used, and a variety of other plasticizers are also known.

The plasticizers, as well as cyanoacrylate compatible perfumes, dyes, pigments, etc., may be added depending on desired uses in amounts which do not adversely affect the stability of the α-cyanoacrylate monomer. The use of such additives is within the skill of those practicing in the cyanoacrylate adhesive art and need not be detailed herein.

The effects of various sulfur-containing additives on the thermal properties of cured cyanoacrylate polymers were investigated in several ways. Thermal analyses of cyanoacrylate polymers to which had been added amounts of additive as shown in Table I were conducted dynamically to determine temperature at which decomposition onset occurred and isothermally at 150° C. to determine relative weight loss of polymer on heat aging. Fixture speeds and 82° C. stability were performed on monomer formulations containing the additives to ascertain whether the additive affected the cure speed or storage stability of the formulation. Results are summarized in Table I.

EXAMPLE I

Thermal analysis was done using two different instruments, the DuPont 2100 Thermal System with 951 Thermogravimetric Analyzer attached, and Seiko SSC5245HM2 controller attached to TG/DTA220 Thermogravimetric Differential Thermal Analyzer. Isothermal thermal runs were started from 30° C. and heated at 50° C./minute up to 150° C. and held at that temperature for 900 minutes under 250 cc/min nitrogen gas flow. Temperature dynamic runs were started at 30° C. and heated at 10° C./min up to 450° C. under 250 cc/min nitrogen gas flow.

Samples for dynamic analyses were all prepared by intimate mixing with a mortar and pestle of a prepolymerized cyanoacrylate polymer and the additive followed by heating of the mixture at 100° C. for two hours. Samples for isothermal analyses were either prepared in the same way or from a film prepared by placing a droplet of a monomer formulation containing the additive between pressed Santoprene ™ blocks for 72 hours at room temperature followed by post curing at 100° C. for 2 hours, and then separating the resulting polymer film. Both methods of sample preparation were found to give equivalent results.

Freshly distilled ethyl cyanoacrylate monomer containing methane sulfonic acid (10 ppm), sulfur dioxide (2 ppm) and hydroquinone (3000 ppm) was used in preparing thermogravimetry analysis samples.

Fixture speeds were measured on formulations containing a polymethyl methacrylate (6 wt %), hydrophobic silica (6 wt %), calixarene (0.5 wt %) and silacrown (0.5 wt %) in ethyl cyanoacrylate monomer.

TABLE I

| Additive | % | Onset of decomposition temp (°C.) | % Wt loss at 150° C. in 900 min | 82° C. Stability (days) | Fixture speed (sec) Balsa wood | Fixture speed (sec) Cow leather |
| --- | --- | --- | --- | --- | --- | --- |
| None | 0 | 155 | 98 | 20 | 20 | 35 |
| 2-Hydroxycyclohexyl p-toluenesulfonate | 1.0 | 218 | 20 | 20 | 20 | 35 |
| Phenylethyl p-toluenesulfonate | 1.0 | 190 | 35 | 20 | 20 | 35 |
| α-Methylbenzyl p-toluenesulfonate | 1.0 | 210 | 4 | 20 | 20 | 35 |
| α,α-Dimethylbenzyl p-toluenesulfonate | 1.0 | 210 | 8 | 20 | 20 | 35 |
| o-Nitrobenzyl p-toluenesulfonate | 1.0 | 210 | 4 | 20 | 20 | 35 |
| n-Butyl p-toluenesulfonate | 5.0 | 190 | 30 | 20 | 21 | 35 |
| Acetone disulfonic acid diethyl ester | 5.0 | 195 | 20 | 20 | 20 | 35 |
| Ethyl trifluoromethane sulfonate | 0.1 | 195 | 15 | 20 | 70 | 300 |
| Ethyl methanesulfonate | 1.0 | 195 | 15 | 20 | 70 | 300 |
| Methyl p-toluenesulfonate | 1.0 | 195 | 18 | 20 | 20 | 36 |
| None | 0 | 155 | 98 | 20 | 20 | 35 |
| α-Hydroxyisobutyric acid anhydrosulfite | 0.15 | 199 | 30 | 20 | 20 | 35 |
| Di-α,α'-phenylethyl sulfoxide | 2.0 | 210 | 4 | 20 | 20 | 35 |
| Dibutyl sulfate | 2.0 | 195 | 20 | 20 | 20 | 35 |
| (1R,2S,5R)-(−)-Menthyl(S)-p-toluenesulfinate | 5.0 | 190 | 28 | 20 | 30 | 45 |
| (1S,2R,5R)-(+)-Menthyl(R)-p-toluenesulfinate | 5.0 | 190 | 28 | 20 | 30 | 45 |
| α-Methylthioxo-γ-butyrolactone | 2.0 | 185 | 48 | 20 | 20 | 35 |
| Glycol sulfite | 5.0 | 205 | 7 | 20 | 25 | 40 |
| Dimethyl sulfite | 5.0 | 185 | 40 | 20 | 25 | 40 |
| Diethyl sulfite | 5.0 | 185 | 40 | 20 | 25 | 40 |
| o-Phenylene sulfite | 5.0 | 205 | 10 | 20 | 25 | 40 |

EXAMPLE 2

The cyclic sulfate, 1,3,2-dioxathiolene-4-ethyl-2,2-dioxide, was prepared by reaction of 1,2-butane diol and $SO_2Cl_2$ in refluxing $CCl_4$, followed by ring closure at ice bath temperature after addition of $CH_3CN$, water and catalytic amounts of $RuCl_3$ and $NaIO_4$.

When added at a 1% level to ethyl cyanoacrylate monomer stabilized with methane sulfonic acid/$SO_2$/hydroquinone this sulfate significantly improved the heat aging properties of steel lapshear bonds produced from the monomer after three day room temperature cure followed by heat treatment as shown in Table II.

TABLE II

| Additive | Tensile shear (psi) after heat aging at 121° C. | | | | |
|---|---|---|---|---|---|
| | 1 hr. | 24 hr. | 48 hr. | 72 hr. | 96 hr. |
| None | 4576 | 2747 | 1899 | 1725 | 1566 |
| 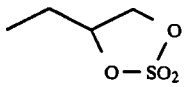 | 4529 | 3332 | 3055 | 2380 | 2446 |

EXAMPLE 3

The di(cyclic sulfate):

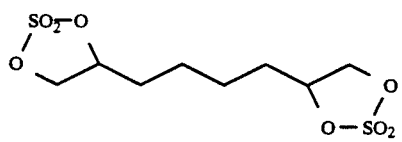

was prepared in a similar manner as described in the previous example from 1,2,7,8-octane tetraol.

When added to ethyl cyanoacrylate monomer stabilized with methane sulfonic acid/SO$_2$/hydroquinone at the 1% level this sulfate improved the heat aging properties of steel lapshear bonds produced from the monomer after overnight room temperature cure followed by heat treatment as shown in Table III.

TABLE III

| Additive | Tensile shear (psi) after heat aging at 121° C. | | |
|---|---|---|---|
| | 1 hr. | 24 hr. | 48 hr. |
| None | 2477 | 1619 | 1350 |
| 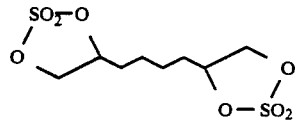 | 2476 | 1958 | 1853 |

EXAMPLE 4

To Loctite Black Max ™, a commercial cyanoacrylate formulation containing an acrylic rubber of the type described in U.S. Pat. No. 4,440,910, was added the sulfur compounds specified in Table IV in the amounts shown in the table. Bonded lap shear specimens were tested after extended heat aging both hot and after returning to room temperature.

TABLE IV

| Additive | % | Tensile shear (psi) after heat aging for 2 weeks at 121° C. | |
|---|---|---|---|
| | | Tested at Room Temperature | Tested at 121° C. |
| Glycol Sulfite | 3.0 | 3349 | 1275 |
| Glycol Sulfite | 1.5 | 2985 | 1343 |
| p-toluene sulfonic acid pentafluoro benzyl ester | 2.0 | 2252 | 1152 |
| p-toluene sulfonic acid pentafluoro benzyl ester | 1.0 | 2168 | 1159 |
| p-toluenesulfonic acid pentafluoro benzyl ester | 0.5 | 2641 | 1373 |

TABLE IV-continued

| Additive | % | Tensile shear (psi) after heat aging for 2 weeks at 121° C. | |
|---|---|---|---|
| | | Tested at Room Temperature | Tested at 121° C. |
| None | — | 1420 | 967 |

What is claimed is:

1. In a cyanoacrylate monomer adhesive formulation the improvement wherein the formulation includes an effective amount for enhancing the thermal resistance of the cured polymer of a sulfur containing compound of the formula:

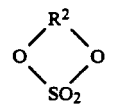

$R^1O-SO-OR^1$

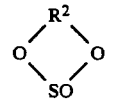

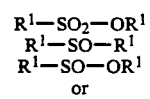

$R^1-SO_2-OR^1$
$R^1-SO-R^1$
$R^1-SO-OR^1$
or

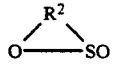

where $R^1$ and $R^2$ are, respectively, monovalent and divalent hydrocarbon groups which may be optionally substituted with halogen, NO$_2$, oxo (=O), CN, alkoxy, hydroxy, acyloxy or SO$_2$ or interrupted by one or more ether oxygen atoms.

2. A formulation as in claim 1 wherein said sulfur-containing compound is an anhydrosulfite.

3. A formulation as in claim 1 wherein said sulfur-containing compound is a sulfoxide.

4. A formulation as in claim 1 wherein said sulfur-containing compound is a sulfite.

5. A formulation as in claim 1 wherein said sulfur-containing compound is a sulfonate.

6. A formulation as in claim 5 wherein said sulfonate is a methanesulfonate or a p-toluenesulfonate.

7. A formulation as in claim 1 wherein said sulfur-containing compound is a sulfinate.

8. A formulation as in claim 1 wherein said sulfur-containing compound is a cyclic sultinate.

9. In a cyanoacrylate monomer adhesive formulation the improvement wherein the formulation includes an effective amount for enhancing the thermal resistance of the cured polymer of a sulfur containing compound of the formula:

$R^1O-SO_2-OR^1$

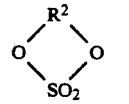

$R^1O-SO-OR^1$

-continued

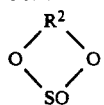

R$^1$—SO$_2$—OR$^1$
R$^1$—SO—R$^1$
R$^1$—SO—OR$^1$
or

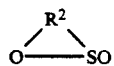

wherein R$^1$ and R$^2$ are, respectively, monovalent and divalent hydrocarbon groups which may be optionally substituted with halogen, NO$_2$, oxo (═O), CN, alkoxy, hydroxy, acyloxy or SO$_2$.

10. A formulation as in claim 9 wherein said sulfur-containing compound is present at a level of 0.1–10% by weight.

11. A formulation as in claim 10 wherein said level is at least 0.5%.

12. A formulation as in claim 11 wherein said level is 0.75%–5% by weight.

13. A formulation as in claim 9 wherein said sulfur-containing compound is an acyclic or cyclic sulfate.

14. A cyanoacrylate polymer, prepared from cyanoacrylate monomer, the polymer comprising between 0.1 and 10% by weight of a sulfur-containing compound of the formula:

R$^1$O—SO$_2$—OR$^1$

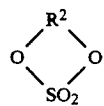

R$^1$O—SO—OR$^1$

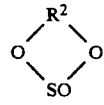

R$^1$—SO$_2$—OR$^1$
R$^1$—SO—R$^1$
R$^1$—SO—OR$^1$
or

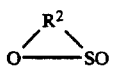

wherein R$^1$ and R$^2$ are, respectively, monovalent and divalent hydrocarbon groups which may be optionally substituted with halogen, NO$_2$, oxo (═O), CN, alkoxy, hydroxy, acyloxy or SO$_2$.

15. A cyanoacrylate polymer as in claim 14 characterized by an onset of decomposition temperature when heated at 10° C. per minute of at least 185° C.

16. A polymer as in claim 15 wherein said temperature is at least 200° C.

17. A polymer as in claim 14 characterized by a weight loss of 40% or less when heated at 150° C. for 900 minutes.

18. A polymer as in claim 17 wherein said weight loss is 20% or less.

19. A polymer as in claim 18 wherein said weight loss is 10% or less.

20. In a cyanoacrylate monomer adhesive formulation the improvement wherein the formulation includes an effective amount for enhancing the thermal resistance of the cured polymer of a sulfate compound having at least one group of the formula:

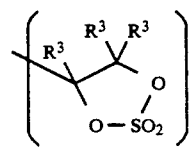

where the R$^3$ groups are independently H, alkyl or aryl.

21. A cyanoacrylate polymer, prepared from cyanoacrylate monomer, the polymer comprising between 0.1 and 10% by weight of a sulfur-containing compound of the formula:

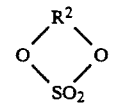

R$^1$O—SO—OR$^1$

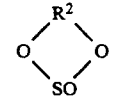

R$^1$—SO$_2$—OR$^1$
R$^1$—SO—R$^1$
R$^1$—SO—OR$^1$
or

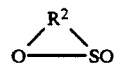

where R$^1$ and R$^2$ are, respectively, monovalent and divalent hydrocarbon groups which may be optionally substituted with halogen, NO$_2$, oxo (═O), CN, alkoxy, hydroxy, acyloxy or SO$_2$ or interrupted by one or more ether oxygen atoms.

* * * * *